(12) United States Patent
Trainin et al.

(10) Patent No.: US 7,408,909 B2
(45) Date of Patent: Aug. 5, 2008

(54) METHOD AND APPARATUS TO ENABLE MULTIPLE RECEIVERS

(75) Inventors: Solomon B. Trainin, Haifa (IL); Shmuel Levy, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 10/833,276

(22) Filed: Apr. 28, 2004

(65) Prior Publication Data

US 2005/0243780 A1    Nov. 3, 2005

(51) Int. Cl.
    *H04Q 7/24*    (2006.01)
(52) U.S. Cl. .................. 370/338; 370/445; 370/447
(58) Field of Classification Search ............... 370/310, 370/313, 328, 338, 465, 445, 447, 461–467
    See application file for complete search history.

(56) References Cited

U.S. PATENT DOCUMENTS

| | | | |
|---|---|---|---|
| 2002/0071448 A1 | 6/2002 | Cervello et al. | |
| 2003/0128684 A1* | 7/2003 | Hirsch et al. | 370/338 |
| 2003/0133469 A1* | 7/2003 | Brockmann et al. | 370/445 |
| 2003/0169769 A1 | 9/2003 | Ho et al. | |
| 2003/0203743 A1* | 10/2003 | Sugar et al. | 455/550.1 |
| 2004/0136339 A1 | 7/2004 | Wentink | |
| 2004/0141496 A1 | 7/2004 | Wentink | |
| 2004/0242252 A1 | 12/2004 | Hoeben | |
| 2005/0135295 A1* | 6/2005 | Walton et al. | 370/328 |
| 2005/0147022 A1* | 7/2005 | Hosur et al. | 370/203 |
| 2006/0153117 A1* | 7/2006 | Bichot et al. | 370/316 |

FOREIGN PATENT DOCUMENTS

| | | |
|---|---|---|
| EP | 1 351 414 | 10/2003 |
| EP | 1 508 992 | 2/2005 |

OTHER PUBLICATIONS

Copy of International Search Report for PCT/US2005/016049, mailed Jan. 19, 2006.

* cited by examiner

*Primary Examiner*—Rafael Pérez-Gutiérrez
*Assistant Examiner*—Abdias Mondesir
(74) *Attorney, Agent, or Firm*—Pearl Cohen Zedek Latzer, LLP

(57) ABSTRACT

Briefly, a wireless communication device that includes a processor to enable a determined number of receivers of a MIMO system according to a value provided with a request to enable the receivers is provided. A method for enabling the receivers of MIMO system is also provided.

9 Claims, 4 Drawing Sheets

METHOD AND APPARATUS TO ENABLE MULTIPLE RECEIVERS

BACKGROUND OF THE INVENTION

In wireless local area network (WLAN) communication systems, for example, local area network (LAN), wireless communication devices (e.g. stations) may transmit and/or receive radio frequency (RF) signals through one or more antennas. Some wireless communication devices may include multiple antennas, for example two or more antennas. Those wireless communication devices may include multiple-input-multiple-output (MIMO) modulation and/or coding to control receiving and transmitting of RF signals through the multiple antennas.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
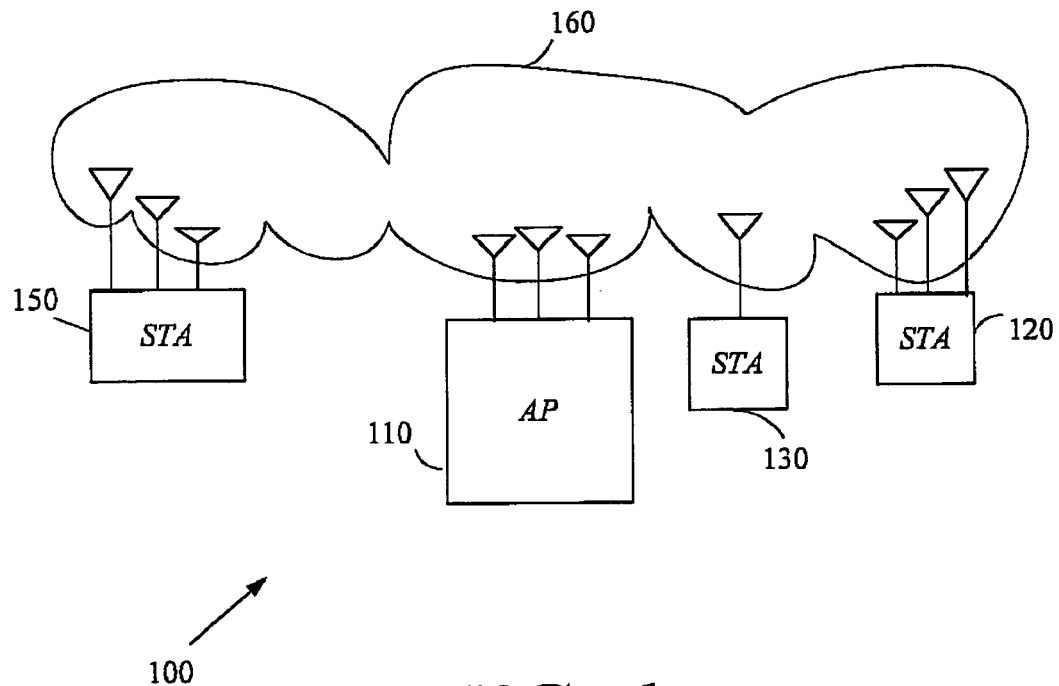
FIG. 1 is an illustration of a portion of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as transmitters and receivers of a radio system. Transmitters and/or receivers intended to be included within the scope of the present invention may include, by way of example only, wireless local area network (WLAN) transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and the like.

Types of WLAN transmitters and/or receivers intended to be within the scope of the present invention include, although are not limited to, transmitters and/or receivers for transmitting and/or receiving spread spectrum signals such as, for example, Frequency Hopping Spread Spectrum (FHSS), Direct Sequence Spread Spectrum (DSSS) orthogonal frequency division multiplexing (OFDM) transmitters and/or receivers, and the like.

Some embodiments of the invention may be implemented, for example, using a machine-readable medium or article which may store an instruction or a set of instructions that, if executed by a machine (for example, by a station of WLAN, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Perl, Matlab, Pascal, Visual BASIC, assembly language, machine code, or the like.

Turning to FIG. 1, a wireless communication system 100 in accordance with an exemplary embodiment of the invention is shown. Although the scope of the present invention is not limited in this respect, wireless communication system 100 may include WLAN based on IEEE 802.11-1999 standards family, if desired. For example, stations and access point (AP) according to the embodiments of the present invention may be used in high throughput (HT) wireless networking such as, for example networks that operates according to IEEE-802.11n, 2004 proposed standard. According to some embodiments of the invention, wireless communication system 100 may include station (STA) 120, STA 130, STA 150, and AP 110. According to embodiments of the invention, at least some of the WLAN stations and APs for example, stations 120, 150 and AP 110 may include a MIMO system and two or more antennas. In addition, wireless communication system 100 may include "legacy" stations, for example STA 130. Legacy stations may include single receiver, single transmitter and at least one antenna Although the scope of the present invention is not limited in this respect, it should be understood that legacy stations may not include MIMO system.

Although the scope of the present invention is not limited in this respect, STA 150, STA 120 and AP 110 may operate in at least one of the following operating modes: single-input-single-output (SISO) mode, multiple-input-single-input (MISO) mode and/or in MIMO mode. Although the scope of the present invention is not limited in this respect, in SISO mode, a single transmitter and a single receiver may be used to transmit and/or receive signals and/or data and/or messages or the like over a wireless shared medium 160. According to embodiments of the invention, in MISO operating mode two or more transmitters may transmit signals and/or data and/or messages or the like, over wireless shared medium 160 and may receive signals and/or data and/or messages or the like, by a single receiver of a MIMO system. Alternatively or additionally, in MIMO operating mode two or more transmitters and two or more receivers may be used to transmit and/or received signals, data, messages or the like over wireless shared medium 160, if desired.

Although the scope of the present invention is not limited in this respect, AP 110 and/or STA 120 and/or STA 150 may initially be set to operate in a SISO or in MISO operating mode and may switch and/or request to switch the other stations and/or AP of wireless communication system 100 to MIMO operating mode. For example, AP 110 operating in a MISO or SISO operating mode may send a request over wireless shared medium 160 to switch STA 120 and STA 150 to MIMO operating mode, if desired. STA 120 and STA 150 may acknowledge the request and may enable an operation of desired number of receivers and transmitters of the MIMO receivers-transmitters system.

Figure 2:
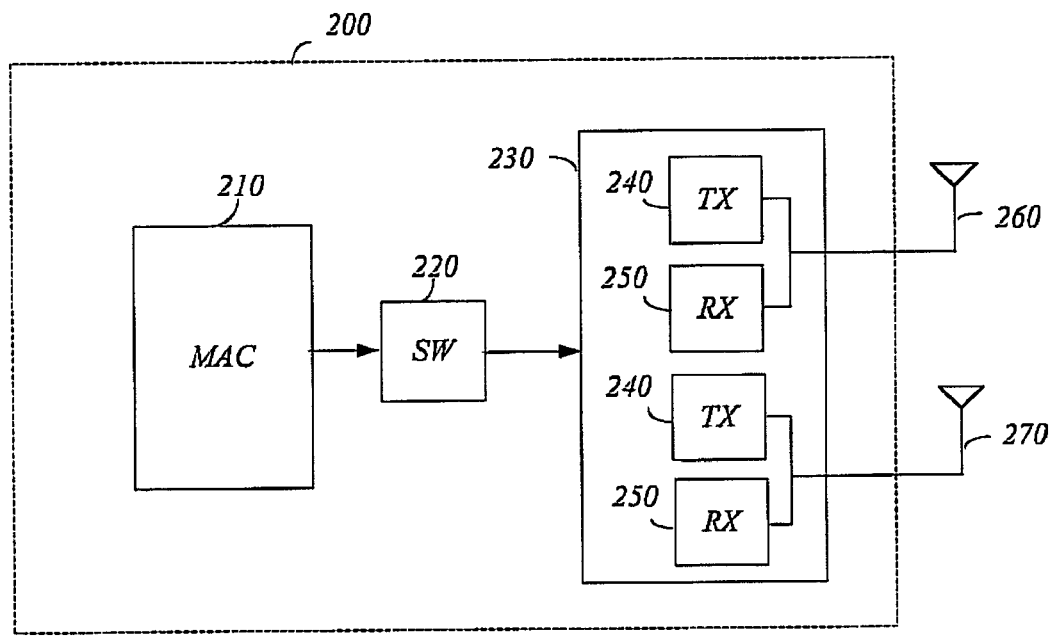
FIG. 2 is a block diagram of a wireless communication device according to some exemplary embodiments of the present invention.

Turning to FIG. 2, a block diagram of a wireless communication device 200, for example, an AP or STA, according to an exemplary embodiment of the invention is shown. Although the scope of the present invention is not limited in this respect, wireless communication device 200 may include a processor 210, for example a medium access control (MAC) processor, a switch (SW) 220 and an MIMO system 230. In some embodiments of the invention, MIMO system 230 may include two transmitters 240 and two receivers 250, although the scope of the present invention is in no way limited in this respect. For example, in other embodiments of the invention, MIMO system 230 may include any desired number of transmitters and receivers. In this exemplary embodiment, transmitters 240 and receivers 250 MIMO system 230 may be operably coupled to antennas 260 and 270.

Although the scope of the present invention is not limited in this respect, antenna 260 and/or antenna 270 may include an internal antenna, or an ommi-directional antenna, or a monopole antenna, or a dipole antenna, or an end fed antenna or a circularly polarized antenna, or a micro-strip antenna, or a diversity antenna, a dual antenna, an antenna array or the like.

Although the scope of the present invention is not limited in this respect, wireless communication device 200 (e.g. STA 120, 150 or AP 110) may be initially set to operate in a SISO or MISO operating mode. According to some embodiments of the invention, wireless communication device 200 may initiate a request to switch stations and/or AP of WLAN into MIMO operating mode by using, for example, Request-To-Send/Clear-To-Send (RTS/CTS) network access mechanism. In some embodiments of the invention, the RTS/CTS network access mechanism may include a modified RTS frame which will be referred as RTS-MIMO frame (RTSM) and a modified CTS frame which will be referred as CTS-MIMO (CTSM) frame. According to some other embodiments of the invention, wireless communication device 200 may be switched to MIMO operating mode by receiving the RTSM frame that may include information, at least, about a desired number of receivers that may be enabled. In response, wireless communication device 200, may send to the other stations and APs of the WLAN (e.g. WLAN 100), a CTSM frame to acknowledge reception of the RTSM frame.

Although the scope of the present invention is not limited in this respect, MIMO system 230 may include Orthogonal Frequency Division Multiplexing (OFDM) transmitters and receivers (e.g. TX 240 and RX 250) that may transmit and receive the RTSM and/or CTSM frames. According to some embodiments of the invention the RTSM and/or CTSM frames may be modulated with Binary Phase Shift Keying (BPSK) modulations scheme with rate ½. However, the scope of present invention is not limited in this respect, hence, the RTSM frame and/or CTSM frame may be modulated by Quadrature Phase-Shift Keying (QPSK), Quadrature Amplitude Modulation (QAM), 16-QAM, 64-QAM, or the like.

Figure 3:
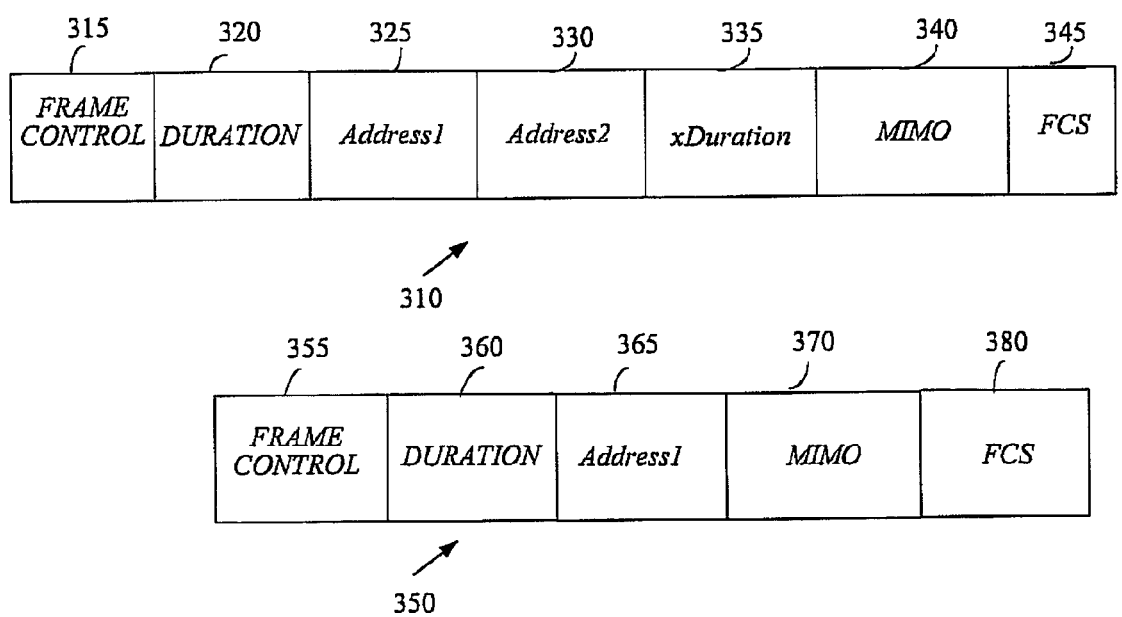
FIG. 3 includes illustrations of an exemplary request to send MIMO (RTSM) frame and an exemplary clear to send MIMO (CTSM) frame, according to embodiments of the present invention.

Turning to FIG. 3 an exemplary RTSM frame 310 and an exemplary CTSM frame 350 according to embodiments of the present invention are shown. Although the scope of the present invention is not limited in this respect, the size of RTSM frame 310 my be 24 octets and may include a frame control subtype (2 octets) field 315, a duration field (2 octets) 320, an Address1 field (6 octets) 325, an Address2 field (6 octets) 330, an extended duration (xDuration) field (2 octets) 335, a MIMO field (2 octets) 340 and a frame check sequence (FCS) field (2 octets) 345.

Although the scope of the present invention is not limited in this respect, the size of CTSM frame 350 my be 16 octets and may include a frame control subtype (2 octets) field 355, a duration field (2 octets) 360, an Address1 field (6 octets) 365, a MIMO field (2 octets) 370 and a FCS field (2 octets) 380.

Although the scope of the present invention is not limited in this respect, frame control subtype field 315 or 355 may include the frame subtype value. For example, the subtype value of frame control subtype field 315 may be RTSM and the subtype value of frame control subtype field 355 may be CTSM. According to some embodiments of the invention, a subsequent frame in a data sequence may be distanced from a former frame by Short Inter Frame Space (SIFS) field (not shown). Thus, duration filed 320 of RTSM frame 310 may include a value that composed from the duration of CTSM frame 350, twice the duration of the SIFS and an additional duration to overlap with at least a beginning portion of the data sequence transmission. In some embodiments of the invention, the value of duration field 320 may be used to update a network access vector (NAV) of legacy stations (e.g. STA 130) to block transmissions of stations, if desired. Duration field 360 of CTSM frame 350 may include a value composed from the SIFS and the duration of the data sequence transmission. In some embodiments of the invention, the value of duration field 360 may be used to update a network access vector (NAV) of legacy and HT MIMO stations, for example, STA 130 and stations STA 110, STA 120, STA 150, respectively. Address1 filed 325 or 365 may include the destination address of the frame. Address2 field 330 may include an address of the transmitting station and the FCS field 345 or 380 may include the cyclic redundancy check (CRC) value of the frame.

Although the scope of the present invention is not limited in this respect, in some embodiments of the present invention, xDuration field 335 of RTSM frame 310 may include a value composed from the duration of CTSM fame 350, duration of at least two SIFS and the duration of the data sequence transmission. In some embodiment of the invention, for example, STA 120, STA 150 and AP 110 may use the value of xDuration field 335 to update the NAV, if desire. MIMO field 340 or 370 may include the number of transmitters and/or receivers of MIMO system 230 that may be enabled and the coding scheme of MIMO system 230. For example, spatial multiplexing, diversity or the like.

Figure 4:
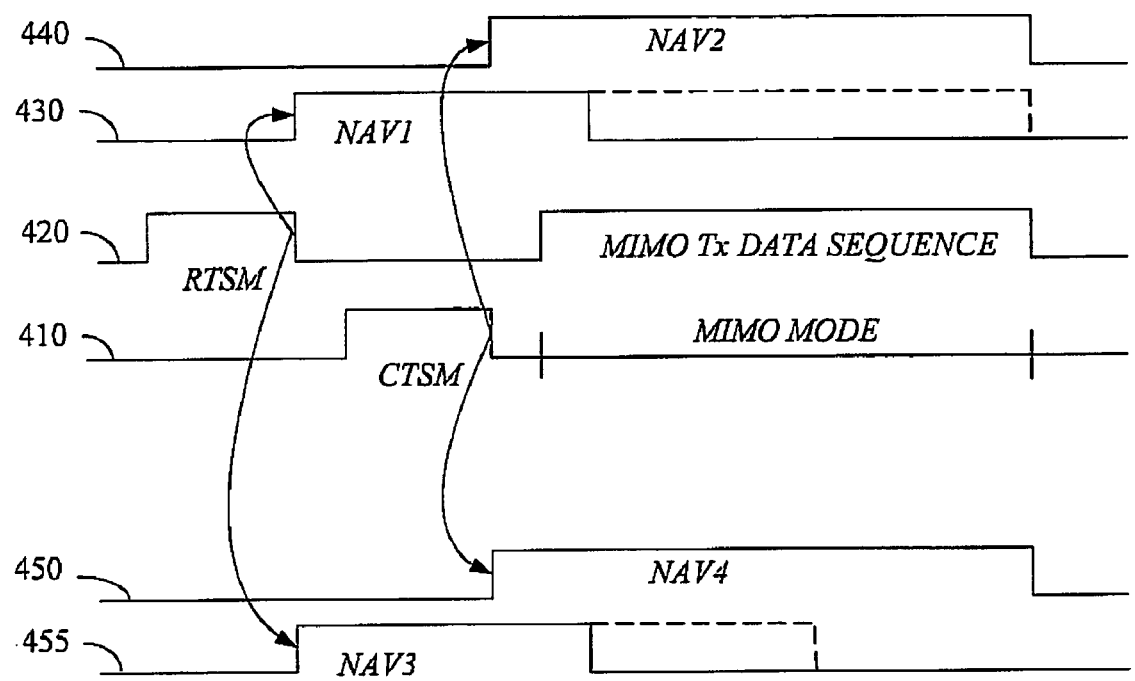
FIG. 4 is a timing diagram of a protocol handshaking for switching a wireless communication device from SISO and/or MISO operating mode to MIMO operating mode according to an exemplary embodiment of the invention.

Turning to FIG. 4 a timing diagram of a protocol for switching a wireless communication device from SISO and/or MISO operating mode to MIMO operating mode according to an exemplary embodiment of the invention is shown. Although the scope of the present invention is not limited in this respect, timing diagrams 410, 420, 430 and 440 show a timing flows of NAV (e.g. timing diagrams 430, 440) a request transmission from a station and/or AP (e.g. timing diagram 420) and an acknowledgment transmission (e.g. timing diagram 410). For example, AP 110 may initiate a request to enable a determined number of receivers of a MIMO system of STA 120 of wireless communication system 100. In addition, timing diagrams 450, 455, may show NAV related to other type of stations and AP for example, legacy station STA 130.

Although the scope of the present invention is not limited in this respect, the WLAN, may include two or more types of stations and/or APs. For example, the first type of stations and APs may be HT stations. HT stations and/or APs may include MIMO system. The second type of stations and APs may be legacy stations and APs.

According to exemplary embodiment of the invention, AP 110 operates in MISO operating mode, may initiate transmission of RTSM frame (e.g. RTSM 310) that include a request to enable, for example, two receivers of STA 120. According to this example, the request to enable desired number of receivers may be provided by MIMO field 340 of RTSM frame 310. In response, STA 120, may acknowledged the reception of RTSM frame 310 (in the range of SIFS time after completion of RTSM frame transmission) by transmitting CTSM frame (e.g., CTSM frame 350) to AP 110.

In some embodiments of the invention, after a predetermined delay, for example less than SIFS time, STA 120 may switch to MIMO operating mode and may enable the desired number of receivers (timing diagram 410). Although the scope of the present invention is not limited in this respect, in some embodiments, Duration field 360 of CTSM frame 350 sent by STA 120 may be calculated from xDuration field 335 of frame RTSM 310 by subtracting duration of CTSM frame 350 and one SIFS time.

Although the scope of the present invention is not limited in this respect, STA 150 may also receive the RTSM frame 310 and may activate NAV1 for the duration composed from, for example, two SIFS times and overlapping time that may include the beginning of data frame sequence as is shown by timing diagram 430. In some embodiments of the invention NAV1 may be used to block other stations and/or APs transmissions over the WLAN. Furthermore, legacy station 130 may receive the RTSM frame 310 and may use the Duration field 320 to activate NAV3. Thus, transmissions of STA 130 may be blocked for the duration of NAV3, if desired Although the scope of the present invention is not limited in this respect, AP 110 may received CTSM frame 350 and may used the value provides by Duration field 360 of CTSM frame 350 to activate NAV2 for the duration shown by timing diagram 440, if desired. In addition, according to some embodiments of the invention, STA 150 and STA 130 may use Duration field 360 of CTSM frame 350 to activate NAV2 and NAV4, respectively for the duration shown by timing diagram 440 and timing diagram 450, if desired.

Although the scope of the present invention is not limited in this respect, after completion of the RTS/CTS handshaking and the blocking of other stations transmissions, AP 110 may start to transmit MIMO data sequence SIFS time after the completion of CTSM frame 350 transmission. However, in some embodiments of the invention, at least one of the WLAN stations and/or APs may not receive CTSM frame 350. In those embodiments, the initiator of the request to switch the operating mode of the stations to MIMO operation mode may not transmit the MIMO data sequence. In those embodiments, the stations and/or the APs may not activate the NAV to block the transmissions.

Although the scope of the present invention is not limited in this respect, in some embodiments of the invention, only some stations and/or APs of the WLAN may receive the acknowledgment message. For example, AP 110 may receive CTSM frame 350 and STA 150 may not receive CTSM frame 350. In those embodiments of the invention, STA 150 may extend the duration of NAV1 to duration of the MIMO data sequence transmission using xDuration field 335 of RTSM frame 310 (shown by the doted line of timing diagram 430) while receiving the beginning of data sequence transmission. However, legacy stations (e.g. STA 130) may extend the NAV3 for at least the end of the duration of the first frame in the data sequence (shown by the doted line of timing diagram 455), if desired.

Figure 5:
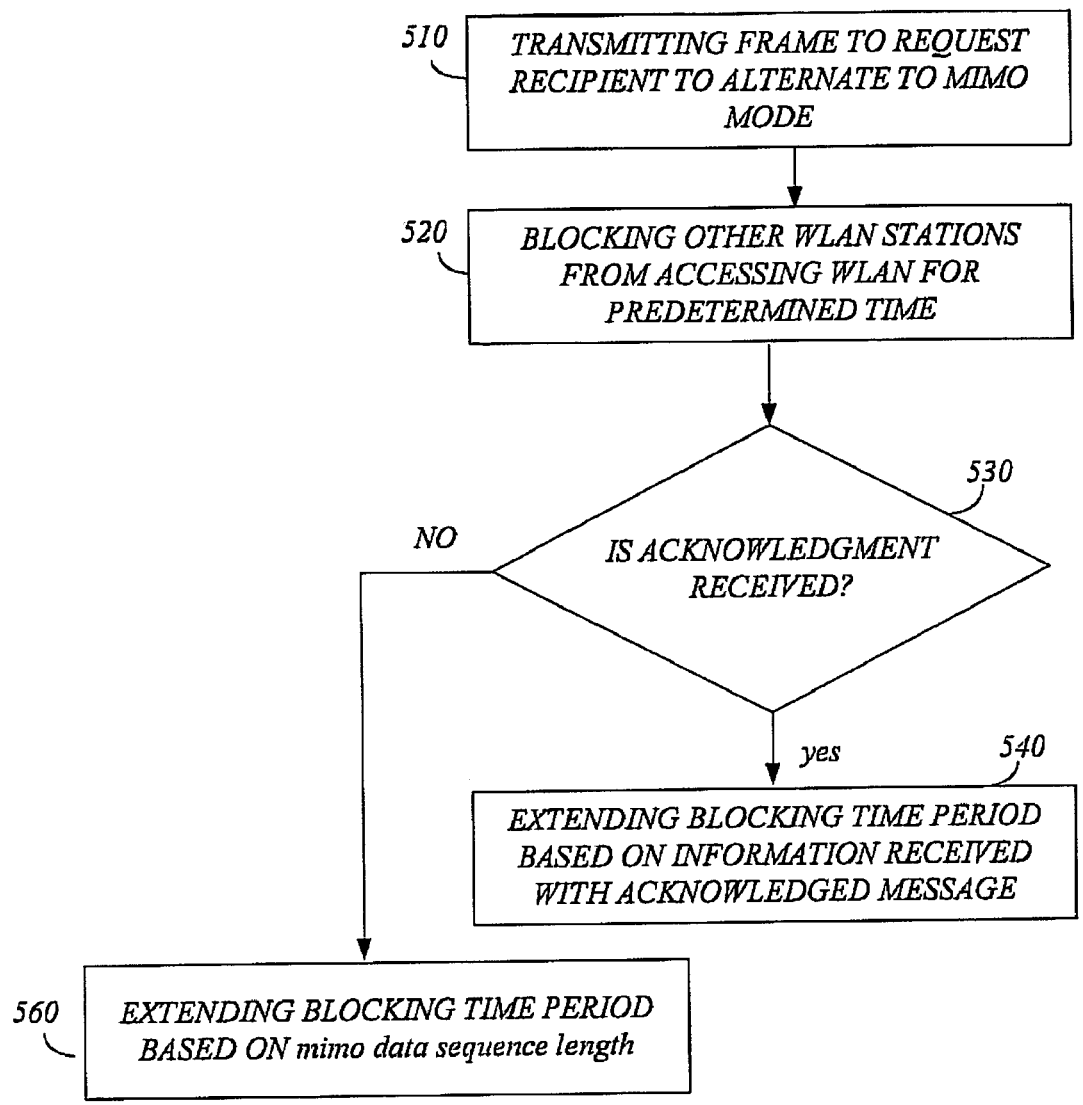
FIG. 5 is a flowchart of a method to enable MIMO operating mode of wireless communication device according to exemplary embodiments of the invention.

Turning to FIG. 5 a flowchart of a method to enable MIMO mode of wireless communication device according to exemplary embodiments of the invention is shown. Although the scope of the present invention is not limited in this respect, a wireless communication device (e.g. station and/or AP) of a wireless communication system (e.g. WLAN) may request a recipient to alternate its current operating mode (e.g. SISO or MISO) to MIMO operating mode (text box 510). In addition, the wireless communication device may block other WLAN stations from accessing the wireless shared medium 160 for a predetermined time (text box 520). For example, by activating an NAV for the desired blocking duration.

Although the scope of the present invention is not limited in this respect, the recipient may send acknowledgment to the wireless communication device that initiate the request (e.g. initiator). In some embodiments of the invention, if the acknowledgment received (text box 520) by the wireless communication device then the wireless communication device may extend the blocking time of the NAV based on the information received with the acknowledgment message (text box 540).

Although the scope of the present invention is not limited in this respect, if the acknowledgment was not received (text box 520) by the wireless communication device then, in some embodiments of the invention, the wireless communication device may extend the blocking time, for example by extending the NAV, based on the MIMO data sequence length (text box 560).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising
   a processor to enable a determined number of receivers of a multiple-inputs-multiple-outputs transmitters-receivers system according to a request to enable the determined number of receivers, wherein the processor is able to control a request-to send/clear-to-send network access mechanism,
   wherein the request-to send/clear-to-send network access mechanism comprises:
      a multiple-in-multiple-out-request-to send frame that includes the request to enable determined number of receivers; and
      a multiple-in-multiple-out-clear-to-send frame to acknowledge the multiple-in-multiple-out-request-request-to send frame,
   wherein the multiple-in-multiple-out-request-to-send message comprises: a first duration field to block transmission of a legacy station; a second duration field to block a high throughput station; and a multiple-in-multiple-out field that include a number of receivers to be enabled.

2. The apparatus of claim 1, wherein the first field includes a value composed from a duration of the multiple-in-multiple-out-clear-to-send frame, at least twice a duration of a short inter frame space and an additional duration to overlap with at least a beginning portion of a data sequence transmission.

3. The apparatus of claim 1 wherein, the second field includes a value composed from a duration of the multiple-in-multiple-out-clear-to-send frame, duration of at least two durations of short inter frame space and duration of a data sequence transmission.

4. A wireless communication device comprising:
   a processor to enable a determined number of receivers of a multiple-inputs-multiple-outputs transmitters-receivers system according to a request to enable the determined number of receivers; and
   two or more dipole antennas operably coupled to two or more transmitters and two or more receivers of the multiple-inputs-multiple-outputs transmitters-receivers system,
   wherein the processor is able to control a request-to send/clear-to-send network access mechanism, wherein the request-to send/clear-to-send network access mechanism comprises:
      a multiple-in-multiple-out-request-to send frame that includes the request to enable the determined number of receivers, and
      a multiple-in-multiple-out-clear-to-send frame to acknowledged the multiple-in-multiple-out-request-to send frame,
   wherein the multiple-in-multiple-out-request-to send message comprises: a first duration field to block transmission of a legacy station; a second duration field to block a high Throughput station; and a multiple-in-multiple-out field to enable the determined number receivers.

5. The wireless communication device of claim 4, wherein the processor is able to control an access to a wireless shared medium according to a network access vector.

6. The wireless communication device of claim 5, wherein the processor is able to block transmissions of stations other than said legacy station and said high throughout station for a desired time period by providing the blocking time to the network access vector.

7. The wireless communication device of claim 6, wherein the desired time period is provided by the request to enable the determined number of receivers of the multiple-inputs-multiple-outputs transmitters-receivers system.

8. The wireless communication device of claim 6, wherein the desired time period is provided by an acknowledgment message.

9. The wireless communication device of claim 6, wherein the desired time period is set according to a length of a multiple-input-multiple-output transmitted data sequence.

* * * * *